United States Patent
Pfeffer

(10) Patent No.: US 10,193,766 B2
(45) Date of Patent: *Jan. 29, 2019

(54) DYNAMIC CHANGING TIER SERVICE ON TEST DEVICE

(71) Applicant: Time Warner Cable Enterprises LLC, New York, NY (US)

(72) Inventor: Howard Pfeffer, Reston, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/242,548

(22) Filed: Aug. 21, 2016

(65) Prior Publication Data

US 2017/0005884 A1    Jan. 5, 2017

Related U.S. Application Data

(63) Continuation of application No. 12/891,726, filed on Sep. 27, 2010, now Pat. No. 9,425,977.

(51) Int. Cl.
| | |
|---|---|
| *H04L 12/24* | (2006.01) |
| *H04L 12/28* | (2006.01) |
| *H04L 12/26* | (2006.01) |

(52) U.S. Cl.
CPC ...... *H04L 41/5038* (2013.01); *H04L 12/2801* (2013.01); *H04L 43/50* (2013.01)

(58) Field of Classification Search
CPC . H04L 12/2801; H04L 12/0213; H04L 12/50; H04L 12/14; H04L 41/0896
See application file for complete search history.

(56) References Cited

U.S. PATENT DOCUMENTS

| | | | |
|---|---|---|---|
| 6,996,064 B2 | 2/2006 | Klassen et al. | |
| 7,246,368 B1 | 7/2007 | Millet et al. | |
| 7,388,870 B2 | 6/2008 | Pfeffer | |
| 7,403,486 B2 | 7/2008 | Flask | |
| 7,623,454 B1 * | 11/2009 | Bugenhagen | H04L 12/46 370/231 |
| 7,706,292 B2 | 4/2010 | Nakano et al. | |

(Continued)

OTHER PUBLICATIONS

Juniper Networks Inc., "Delivering QoS Services in a Cable Environment", downloaded on Aug. 6, 2010 from www.juniper.net, pp. 1-7.

(Continued)

*Primary Examiner* — Shukri Taha
(74) *Attorney, Agent, or Firm* — Otterstedt, Ellenbogen & Kammer, LLP

(57) ABSTRACT

A test device is located within a broadband communications network. The test device is interconnected with a policy enforcement point of the broadband communications network. Responsive to commencement of a test to be conducted with the test device, the policy enforcement point is signaled, from a policy server of the broadband communications network, so as to set a bandwidth tier for the test to be conducted with the test device. The test is conducted with the test device in accordance with the bandwidth tier. One or more additional tests can be conducted for additional, different, bandwidth tier(s). Related methods, systems, apparatuses, and computer program products are also disclosed.

13 Claims, 10 Drawing Sheets

(56) References Cited

U.S. PATENT DOCUMENTS

| | | | |
|---|---|---|---|
| 8,300,541 B2 | 10/2012 | Cholas et al. | |
| 8,619,630 B2 | 12/2013 | Riley et al. | |
| 9,031,679 B2* | 5/2015 | Sandu | G10L 25/60 |
| | | | 370/250 |
| 2003/0056217 A1 | 3/2003 | Brooks | |
| 2007/0298782 A1 | 12/2007 | Wu | |
| 2009/0049102 A1 | 2/2009 | Weissman | |
| 2009/0193486 A1 | 7/2009 | Patel | |
| 2009/0254952 A1 | 10/2009 | Sridhar et al. | |
| 2009/0319596 A1 | 12/2009 | Kumar | |
| 2010/0023979 A1 | 1/2010 | Patel | |
| 2010/0077079 A1* | 3/2010 | Xu | G06F 11/2294 |
| | | | 709/226 |
| 2010/0312892 A1 | 12/2010 | Woundy et al. | |
| 2011/0007752 A1 | 1/2011 | da Silva | |
| 2011/0116419 A1 | 5/2011 | Cholas | |
| 2012/0076015 A1 | 3/2012 | Pfeffer | |

OTHER PUBLICATIONS

Sam Knows & Ofcom, downloaded from http://www.samknows.com/broadband/ofcom_and_samknows on Aug. 2, 2010, pp. 1-5.
PacketCable™ Specifications, Multimedia Specification, PKT-SP-MM-I05-091029, Oct. 29, 2009, Cable Television Laboratories, Inc., pp. i-vi, 1-151.
PacketCable Multimedia Web Service Interface Specification, PKT-SP-MM-WS-I03-091029, Oct. 29, 2003, Cable Television Laboratories, Inc, pp. i-vi, 1-80.
PacketCable™ Technical Report, Multimedia Architecture Framework,PKT-TR-MM-ARCH-V03-091029,Oct. 29, 2009, Cable Television Laboratories, Inc., pp. i-vi, 1-38.
IETF RFC 4291, IP Version 6 Addressing Architecture, Feb. 2006, pp. 1-25, R. Hinden et al.
IETF RFC 3171, IANA Guidelines for IPv4 Multicast Address Assignment, Aug. 2001, pp. 1-8, Z. Albanna et al.
Jason Palmer, Broadband Rates Not Up to Speed, Downloaded From news.bbc.co.uk, Sep. 23, 2010, pp. 1-3.
Milab, FCC Launches Consumer Broadband Test, Downloaded From www.measurementlab.net Sep. 23, 2010, pp. 1-2.
Ian Paul, FCC Offers Free Broadband Speed Test, PC World, March 12, 2010, pp. 1-3, Downloaded from http://www.pcworld.com/article/191398/fcc_offers_free_broadband_speed_test.html Jun. 12, 2013.
Opencable Application Platform, Downloaded From en.wikipedia.org/wiki/opencable_application_platfom Jun. 12, 2013, pp. 1-3.
Cable Labs, Packet Cable Multimedia Specifications, Downloaded From www.cablelabs.com on Aug. 2, 2010, p. 1.
Broadband.gov Consumer Resources Consumer Broadband Test, Downloaded From http://www.broadband.gov/qualitytest/about/, Jun. 12, 2013, pp. 1-3.
Open Cable Specification Ocap Bundle 1.2.1, Downloaded from http://www.cablelabs.com/opencable/specifications/ocap_121.html, Jun. 12, 2013, p. 1.

* cited by examiner

FIG. 7

LIGHT TIER (THERE ARE RANGES WHICH VARY BY LOCATION)
1.5 Mbps down; 384 kbps up
768 kbps down/128 kbps up

BASIC TIER
1.5 M down/256 k up
3 M down/384 k up

STANDARD
10 M down/1 M up
5 M down/ 384 k up

TURBO
8 M down/512 k up
15 M down/2 M up

EXTREME
30 M down/5 M up

WIDEBAND
35 M down/5 M up
50 M down/5 M up

DYNAMIC CHANGING TIER SERVICE ON TEST DEVICE

CROSS-REFERENCE TO RELATED APPLICATION

This application is a continuation of co-assigned U.S. patent application Ser. No. 12/891,726 of inventor HOWARD PFEFFER, and claims the benefit thereof, said application Ser. No. 12/891,726 having been filed on Sep. 27, 2010, and entitled "DYNAMIC CHANGING TIER SERVICE ON TEST DEVICE." The complete disclosure of the aforesaid application Ser. No. 12/891,726 is expressly incorporated herein by reference in its entirety for all purposes.

FIELD OF THE INVENTION

The present invention relates generally to communications systems and methods, and, more particularly, to broadband communication networks and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID so that a decoder can select the elementary stream(s) it needs and reject the remainder. Packet-continuity counters may be implemented to ensure that every packet that is needed to decode a stream is received.

Until recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

Another significant issue is network speed. Ofcom, the UK communications regulator, has undertaken a comprehensive study of broadband provider performance.

SUMMARY OF THE INVENTION

Principles of the present invention provide techniques for dynamic changing tier service on a test device.

In one aspect, an exemplary method includes the step of locating a test device within a broadband communications network. The test device is interconnected with a policy enforcement point of the broadband communications network. Additional steps include, responsive to commencement of a test to be conducted with the test device, signaling the policy enforcement point, from a policy server of the broadband communications network, to set a bandwidth tier for the test to be conducted with the test device; and conducting the test with the test device in accordance with the bandwidth tier.

In another aspect, an exemplary system includes a broadband communications network; a policy enforcement point of the broadband communications network; a policy server of the broadband communications network; and a test device located within the broadband communications network. The test device is interconnected with the policy enforcement point of the broadband communications network. The policy server is configured to, responsive to commencement of a test to be conducted with the test device, signal the policy enforcement point to set a bandwidth tier for the test to be conducted with the test device. The policy enforcement point and the test device are cooperatively configured to conduct the test in accordance with the bandwidth tier.

In still another aspect, an exemplary method includes the step of, responsive to an indication of commencement of a first test to be conducted with a test device located within a broadband communications network, signaling a policy enforcement point, from a policy server of the broadband communications network, to set a first bandwidth tier for the first test to be conducted with the test device. The test device is interconnected with the policy enforcement point of the broadband communications network. An additional step includes, responsive to an indication of commencement of a second test to be conducted with the test device, signaling the policy enforcement point, from the policy server of the broadband communications network, to set a second bandwidth tier for the second test to be conducted with the test device. The first and second bandwidth tiers are different.

In yet another aspect, an exemplary method includes the step of facilitating location of a test device within a broadband communications network. The test device is interconnected with a policy enforcement point of the broadband communications network. Additional steps include conducting a first test with the test device in accordance with a first bandwidth tier dynamically set by an operator of the broadband communications network; and conducting a second test with the test device in accordance with a second bandwidth tier set by the operator of the broadband communications network. The first and second bandwidth tiers are different.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, in one or more embodiments, dynamic changing of tiers in connection with tests allows obtaining statistically significant sample sizes for each tier without the need to engage large samples of users, thereby enhancing operational efficiency.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 tabulates a non-limiting example of tiers of service offered by a major MSO.

DETAILED DESCRIPTION OF PREFERRED EMBODIMENTS

Figure 1:
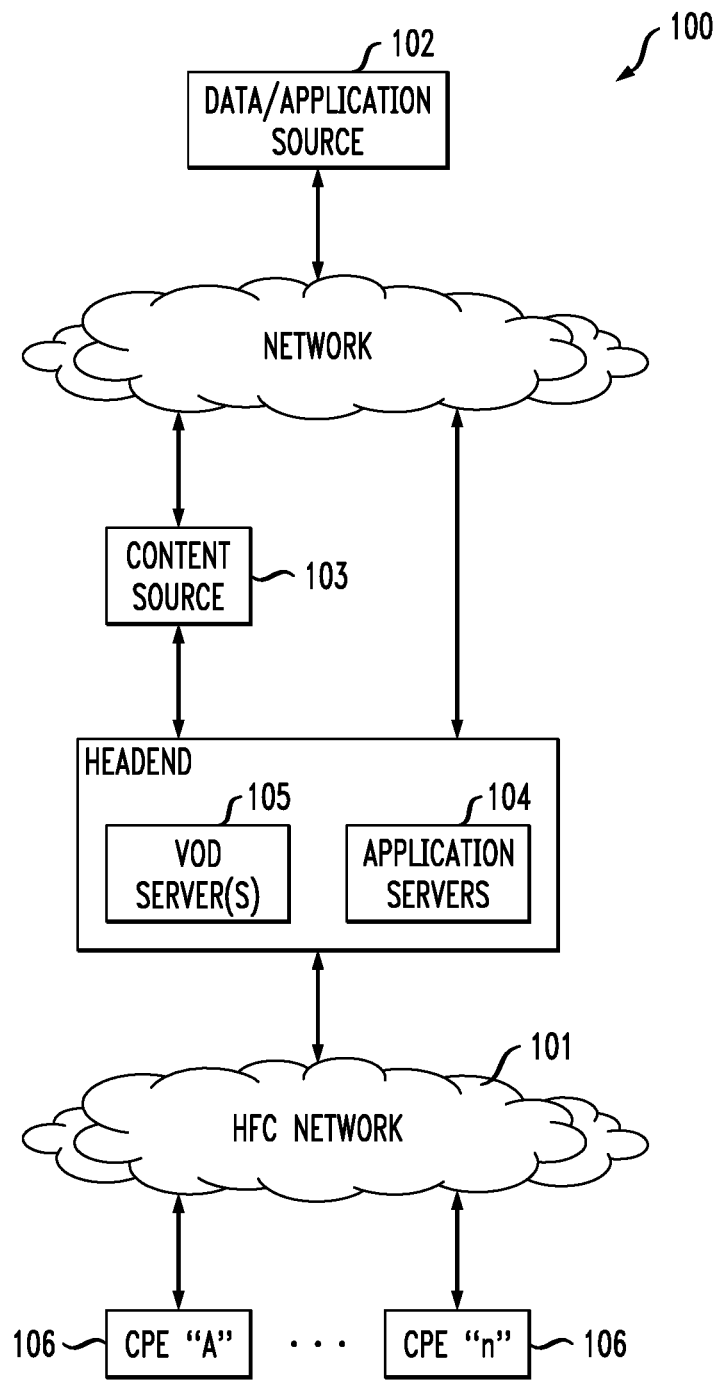
FIG. 1 is a functional block diagram illustrating an exemplary hybrid fiber-coaxial (HFC) network configuration useful with one or more embodiments of the present invention.

An existing issue is how to measure actual versus advertised network speeds. The FCC wants broadband Internet Service Providers (ISPs) to report these network speeds so that consumers can make an educated purchasing decision. Current methods of testing various programming tiers in content based networks are often costly and inefficient.

One current test methodology includes creating test panels of consumers in each tier of service that the ISP provides. Tiers of service may include, for example, standard, light, basic, turbo, and the like. To obtain a statistically accurate measurement, the test panel may have to be inconveniently large, because there is typically a large population of users that are randomly distributed within each tier of service. The test panel has to be sufficiently large to create enough test points to have a statistically significant test size to measure the mean, the median, the standard deviation and to eliminate outliers. These test panels need to be duplicated in each tier of service.

Generally, testing is conducted by creating a large panel of consumers with cable modems in their homes in the various programming tiers. The cable modems are accessed when idle and various metrics (latency, packet loss, query times, failures, web page loading times, and the like) are monitored.

Currently, individual performance or speed testing from various tests points is not done. Passive monitoring devices are used to look at aggregate data (e.g., utilization, latency).

One potential issue that may be encountered with this method, in at least some instances, is that the ISP does not have control over the cable modems. A customer may modify his or her in-home network by changing the configuration of the test device or by moving it, both of which actions can modify the test results. There may also be some other local interference in the home that modifies the test results.

Another potential issue that may be encountered in at least some instances is that many of the test devices used in the home are configured to run tests only when the consumer is idle.

One or more embodiments advantageously provide a method of dynamically changing the tier of service on a test device, reducing or eliminating the need for maintaining a large panel of test points to insure a statically valid population of test devices in each tier.

In one or more embodiments, a test device can distributed throughout the plant, i.e., at a node, hub or some other point in the cable plant. The test device can communicate with an application server in the network, and, via that connection, can be dynamically configured to mimic a customer in any one of the tiers of service offered by the ISP. Then, a test can be run.

In some instances, by using dedicated cable modems and monitoring devices in the network, PacketCable™ multimedia protocols (PCMM)(mark of Cable Television Laboratories, Inc., Louisville, Colo., USA) can be leveraged to dynamically change tiers for each test. In order to verify that this method is accurate, i.e., that these test devices are providing the same measures from their position in the plant that they would be providing in the customer's homes, in one or more embodiments, a double blind study is preferably conducted. For example, a test device can be mounted in an enclosure on a pole outside a subscriber home while there is a separate test device in the home. Both devices can run tests and they can be compared for accuracy.

Advantageously, in one or more embodiments, fewer devices can be used to conduct more tests, as compared to current techniques.

In one or more instances, a test suite is provided to measure maximum speed.

An exemplary embodiment will be described within the context of a hybrid fiber coaxial (HFC) network employing DOCSIS and PCMM. However, it is to be emphasize that this is for purposes of illustration and not limitation, and aspects of the invention can be employed in many different contexts, employing a policy server and a policy enforcement point on many different kinds of networks; e.g., digital subscriber line (DSL), a fiber to the home (FTTH) or fiber to the premises (FTTP) network, and the like.

FIG. 1 illustrates a typical content-based network configuration with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) CPE 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104.

Figure 1A:
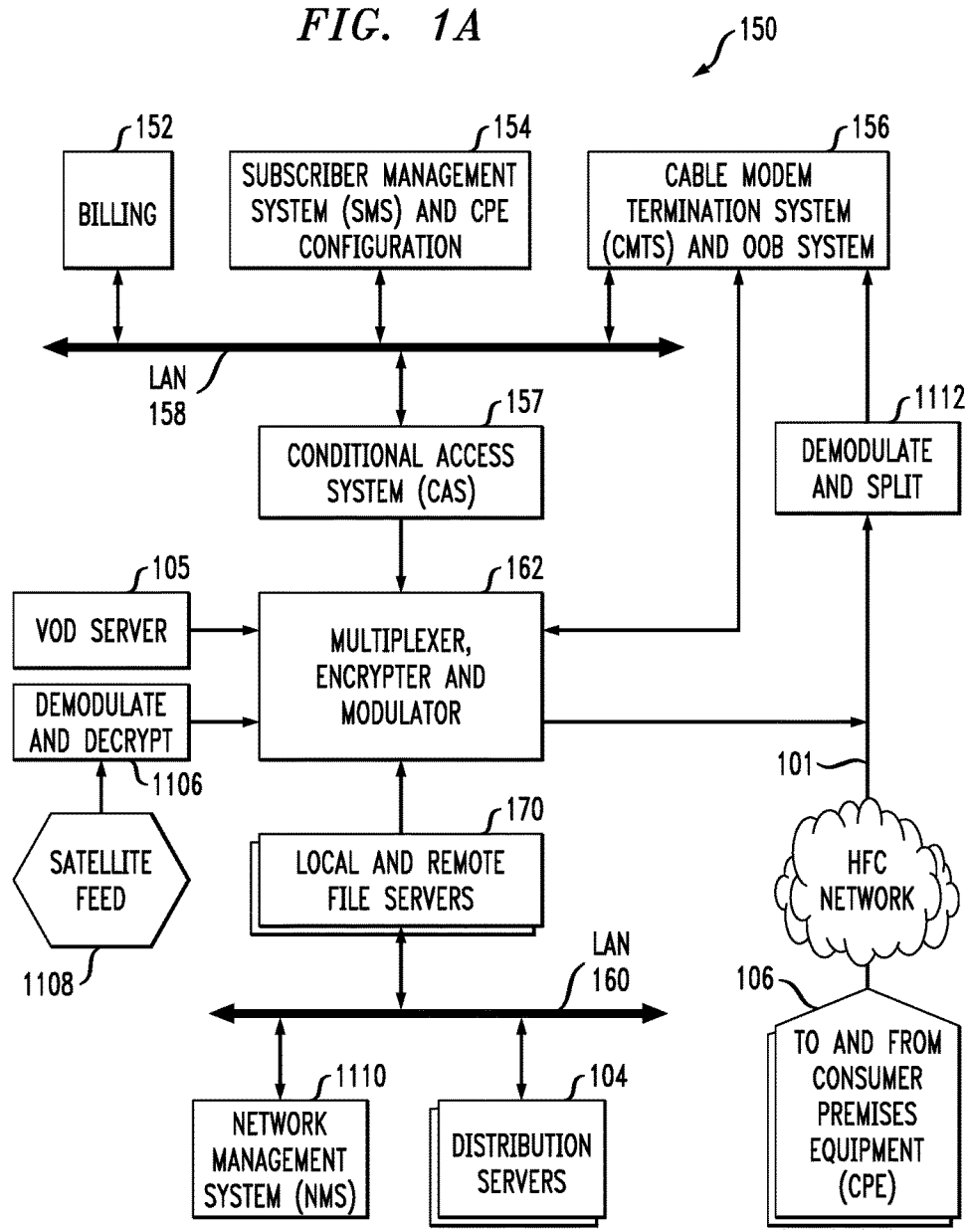
FIG. 1A is a functional block diagram illustrating one exemplary HFC cable network head-end configuration useful with one or more embodiments of the present invention.

Referring now to FIG. 1A, one exemplary embodiment of a head-end architecture useful with the present invention is described. As shown in FIG. 1A, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
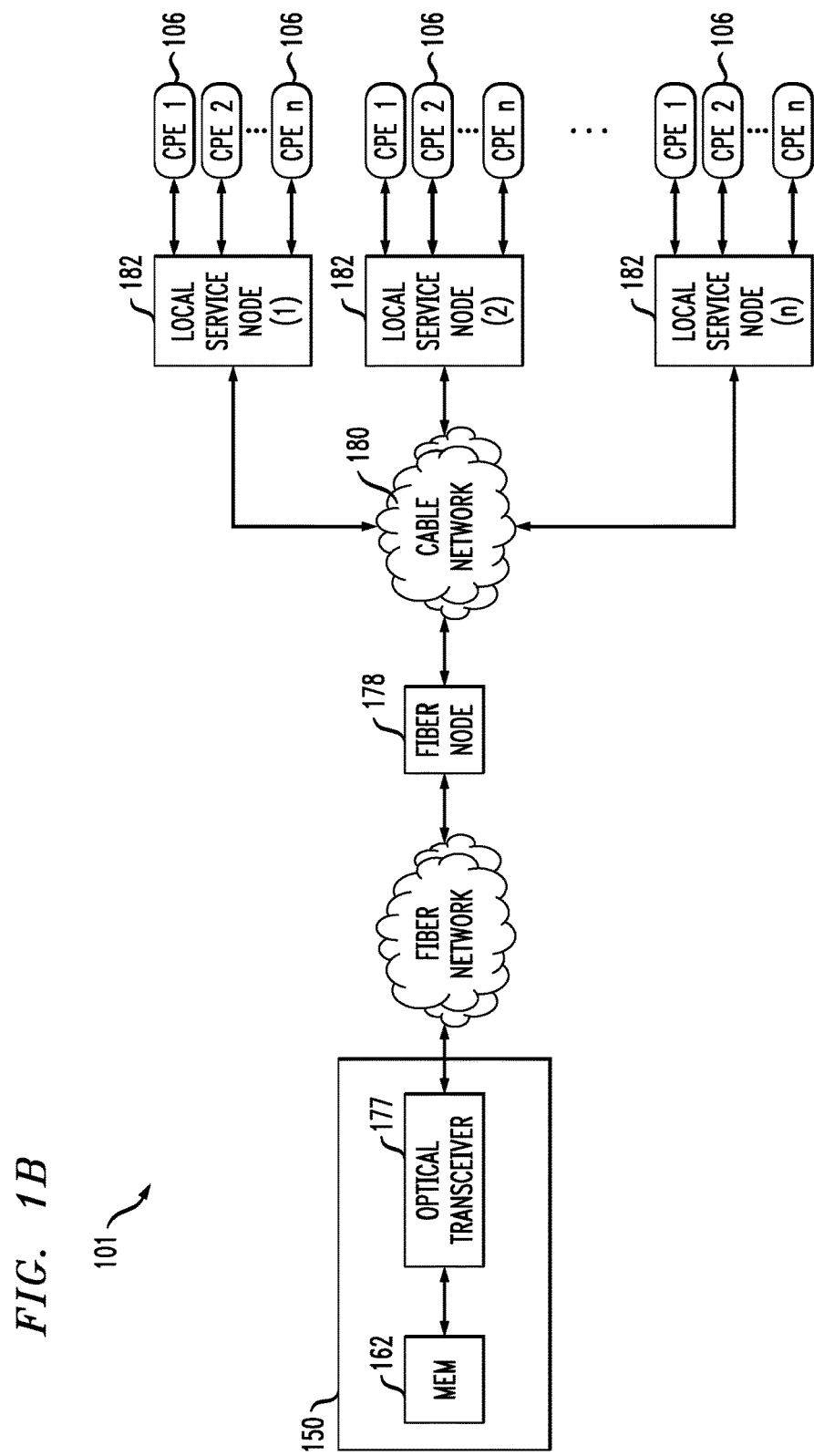
FIG. 1B is a functional block diagram illustrating one exemplary local service node configuration useful with one or more embodiments of the present invention.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
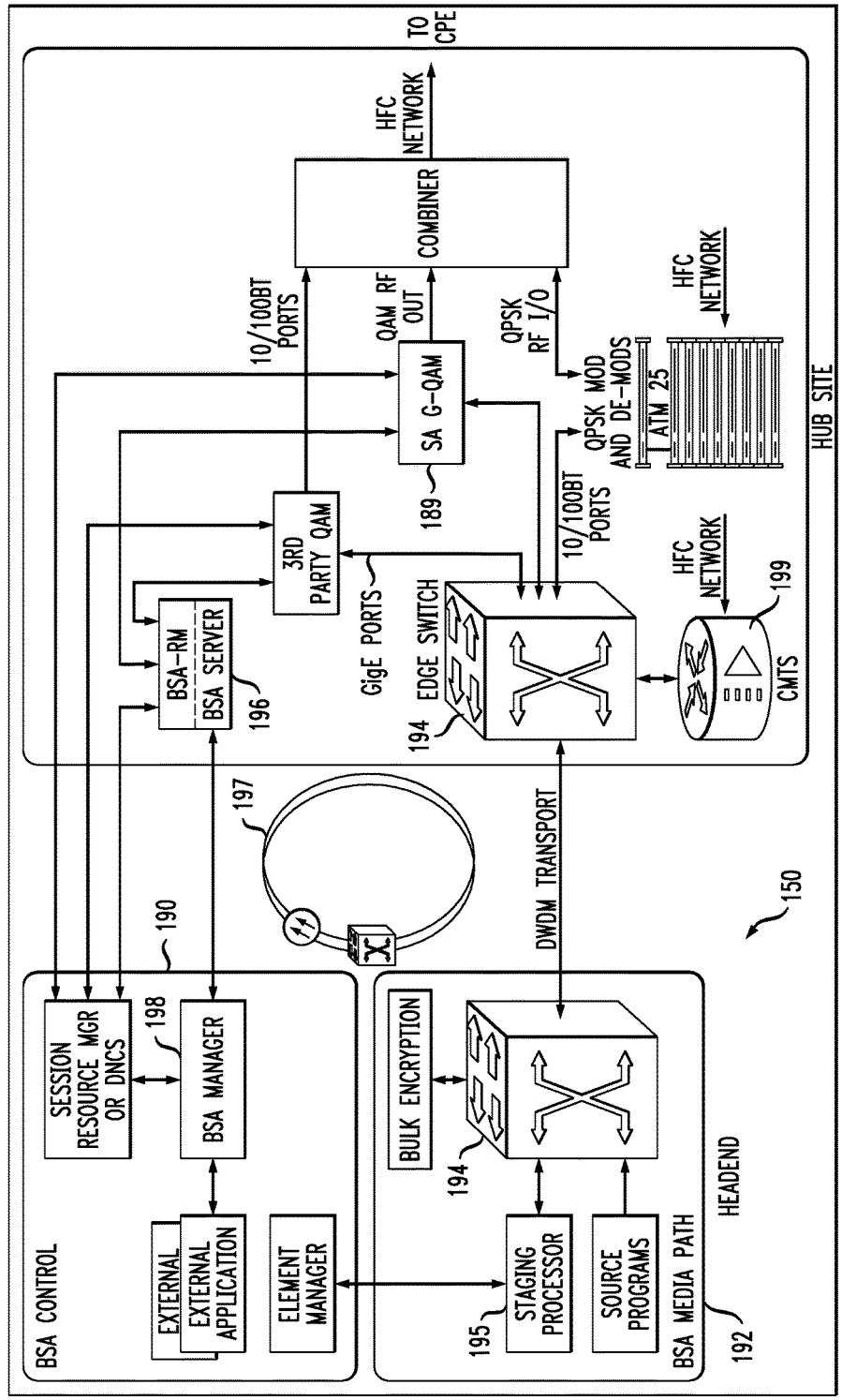
FIG. 1C is a functional block diagram illustrating one exemplary broadcast switched architecture (BSA) network useful with one or more embodiments of the present invention.

FIG. 1C illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1C shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

U.S. Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1A-1C also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1C, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1C can, in the most general case, be the same or different as that shown in the hub site of FIG. 1C. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It is believed that the skilled artisan will be familiar with DOCSIS and PCMM, and given the teachings herein, will be able to employ same to implement one or more embodiments of the invention. Nevertheless, the following documents are expressly incorporated herein by reference in their entireties for all purposes:

U.S. Pat. No. 7,388,870 of Pfeffer et al., entitled "System and method for providing premium transport in a DOCSIS-compliant cable network"

PacketCable™ Specification Multimedia Specification PKT-SP-MM-I05-091029 of Cable Television Laboratories, Inc.

PacketCable™ Multimedia Specifications PacketCable Multimedia Web Service Interface Specification PKT-SP-MM-WS-I03-091029 of Cable Television Laboratories, Inc.

PacketCable™ Technical Report Multimedia Architecture Framework PKT-TR-MM-ARCH-V03-091029 of Cable Television Laboratories, Inc.

As touched on above, Hybrid Fiber Coax (HFC) cable networks were originally built to deliver broadcast-quality TV signals to homes. The wide availability of such systems and the extremely wide bandwidth of these systems led to the extension of their functionality to include delivery of high-speed broadband data signals to end-users. Data over Cable System Interface Specifications (DOCSIS), a protocol elaborated under the leadership of Cable Television Laboratories, Inc., has been established as the major industry standard for two-way communications over HFC cable plants.

The basic elements of a DOCSIS-compliant cable network are the cable modem, located on the subscriber's site, and the cable modem termination system (CMTS) and head end located in facilities operated by the cable service provider. The medium between the CMTS and the different cable modems is a two-way shared medium, in which the downstream channels carry signals from the head-end to users and upstream channels carry signals from users to head-end. A cable modem is normally tuned to one upstream channel and the associated downstream channel. The upstream channel is an inherently shared medium in which slots are reserved using a contention system while the downstream is a broadcast dedicated link from the CMTS to the cable modem.

A quality of service (QoS) level is defined for communications between a cable modem and a CMTS for each service to which a subscriber subscribes. For example, a basic data service subscriber may receive downstream traffic at a maximum burst rate of 3 Mbps, while a premium subscriber may receive downstream traffic at a maximum burst rate of 6 Mbps. Other non-limiting exemplary values are tabulated elsewhere herein. Voice over IP (VoIP) services are typically provided with very stringent QoS requirements to assure that the quality of a cable-delivered telephone call will equal or exceed the call quality of a call placed over the public switched telephone network.

The principal mechanism for providing enhanced QoS is to classify packets traversing the path between a cable modem and CMTS into a service flow. A service flow is a unidirectional flow of packets that is provided a particular Quality of Service. The cable modem and CMTS provide this QoS by shaping, policing, and prioritizing traffic according to a QoS parameter set defined for the service flow.

Service flows exist in both the upstream and downstream direction, and may exist without actually being activated to carry traffic. Service flows have a 32-bit service flow identifier (SFID) assigned by the CMTS. All service flows have an SFID. An active and admitted upstream service flow also has a 14-bit Service Identifier (SID). At least two service flows are defined in a configuration file received by a cable modem: one for upstream and one for downstream service. The first upstream service flow describes the primary upstream service flow, and is the default service flow used for otherwise unclassified traffic. The first downstream service flow describes service to the primary downstream service flow. Additional service flows defined in the configuration file create service flows that are provided QoS services.

Conceptually, incoming packets are matched to a classifier that determines to which QoS service flow the packet is forwarded. The header of the packet is examined. If the packet matches one of the classifiers, it is forwarded to the service flow indicated by the SFID attribute of the classifier. If the packet is not matched to a classifier, it is forwarded on the primary service flow.

A classifier is a set of matching criteria applied to each packet entering the cable network. It comprises some packet matching criteria (destination IP address, for example), a classifier priority, and a reference to a service flow. If a packet matches the specified packet matching criteria, it is then delivered on the referenced service flow. Several classifiers may all refer to the same service flow. The classifier priority is used for ordering the application of classifiers to packets. Explicit ordering is necessary because the patterns used by classifiers may overlap. Downstream classifiers are applied by the CMTS to packets it is transmitting, and upstream classifiers are applied at the cable modem and may be applied at the CMTS to police the classification of upstream packets. The characteristics of a provisioned downstream service flow are defined in a DOCSIS configuration file downloaded by the cable modem when it boots and provided to the CMTS by the cable modem during registration.

Multiple service flows can be assigned per cable modem in either the upstream or downstream direction, and each of these service flows can correspond to a different QoS parameter set with different characteristics. This is conducive to allowing the cable modem to accommodate multiple kinds of data traffic at once, such as standard Internet traffic and Voice over IP (VoIP).

To guarantee bandwidth for a specific service, a network device is preferably able to identify packets associated with that service in all the IP traffic flowing through it. This identification and grouping process is called packet classification. Media gateways and MTAs use various match criteria to place traffic into a certain number of classes. Packet marking is the process of setting a Type of Service (ToS) bits or Differentiated Service Code Point (DSCP) bits in the IP header.

Modern IP enabled services such as voice over IP (VoIP) and MPEG Video over IP have a requirement for an assured rate of throughput, as well as strict requirements for latency and jitter, which could not be provided in a best effort environment. In addition, these kinds of services are not typically always active and, as such, resources to accommodate them need only be allocated when these services are required. For this reason, DOCSIS provides a range of modes for cable modem data transmission that can be initiated and terminated dynamically to accommodate these advanced IP services. Each of these modes can be applied to a QoS Parameter Set that defines characteristics of an upstream service flow:

Unsolicited Grant Service (UGS): A service flow is created that allows a Cable Modem to transmit fixed-size bursts of data at a guaranteed rate and with a guaranteed level of jitter by providing periodic transmission opportunities to the Cable Modem for fixed-size frames. This kind of service flow is particularly suitable for Voice over IP applications.

Real-Time Polling Service (rtPS): A service flow is created giving a periodic opportunity for a Cable Modem to request permission to transmit data by polling one Cable Modem for a bandwidth request, rather than all modems. This satisfies applications that have a requirement for real time data transmission as well as allowing the cable modem to transmit data bursts of varying length. This kind of service flow is particularly suitable for MPEG video over IP.

Unsolicited Grant Service with Activity Detection (UGS/AD): This kind of service flow is a combination of UGS and rtPS and is useful for services that require a UGS style of fixed-size and fixed-rate transmission opportunities, but have significant periods where no data is being sent. One good example of this might be a Voice over IP phone call where up to 50% or more of the call may be silence and require no data transmission. While words are being spoken and packetized voice needs to be transmitted, the Cable Modem receives UGS style grants from the CMTS. When there is silence, the CMTS detects the absence of data and switches to an rtPS style mode, which temporarily frees up upstream bandwidth. When the conversation restarts and the Cable Modem needs to transmit more packetized voice, the Cable Modem transmits a further request to the CMTS via an rtPS granted opportunity and then the UGS style grants re-commence.

Non-Real-Time Polling Service: This kind of service flow is like the rtPS, however polling will typically occur at a much lower rate and may not necessarily be periodic. This applies to applications that have no requirement for a real time service but may need an assured high level of bandwidth. An example of this may be a bulk data transfer or an Internet Gaming application.

A downstream service flow also uses QoS parameters to define particular downstream service flows. For example, QoS parameters used in the downstream direction comprise a "minimum reserved traffic rate," a "traffic priority," and a "maximum downstream latency." These downstream QoS parameters may be used by a scheduler in the CMTS to ensure that preferred traffic receives some guarantees for delivery within a certain amount of time and that that traffic is given priority over other traffic during times of downstream network congestion.

As noted above, Ofcom, the UK communications regulator, has undertaken a comprehensive study of broadband provider performance. Furthermore, in the US, the Consumer Broadband Test, currently in beta, is the FCC's first attempt at providing consumers real-time information about the quality of their broadband connections.

Figure 2:
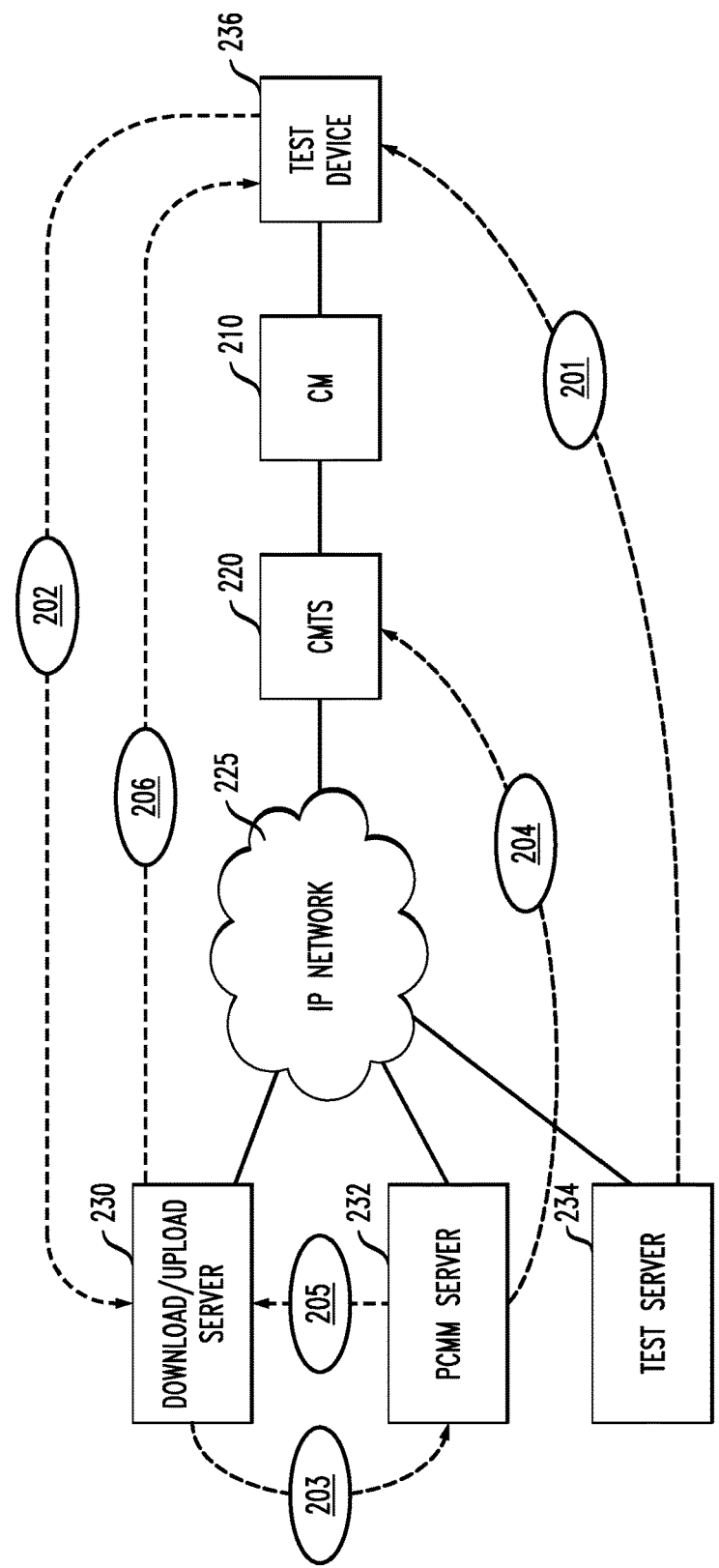
FIG. 2 is a functional block diagram, with command and data flows, depicting a download server-initiated technique for dynamically changing tier of service on a test device, in accordance with one embodiment of the invention.

FIG. 2 is a functional block diagram, with command and data flows, depicting a download server-initiated technique for dynamically changing tier of service on a test device, in accordance with one embodiment of the invention. Referring to FIG. 2, a cable network includes a cable modem termination system (CMTS) 220, an Internet Protocol (IP) network 225, a download server 230, a PCMM server 232, and a test server 234. See comments on "download server," "upload server," "download-upload server," and "test material server" below. CMTS 220 preferably includes a CMTS datastore (not separately illustrated) that maintains service flow definitions that are mapped to service classifiers. Such a datastore is known, for example, from the aforementioned U.S. Pat. No. 7,388,870. A cable modem 210 is connected to CMTS 220 and provides network connectivity to test device 236.

In a non-limiting exemplary embodiment, test device 236 is a so-called "White Box" available from SamKnows Limited, London, UK. However, any arrangement which changes the tier of service based on a request from a testing device and/or testing server is appropriate. Other non-limiting examples include software running on a server, personal computer (PC), or other processing device; a self-contained hardware device; an embedded hardware device; software running in a cable modem; or the like. In DSL, maximum speed may be limited by loop length, such that it may only be possible to reduce available service tiers; this can be taken into consideration when locating test equipment. One or more embodiments of the invention are not limited only to HFC networks, but can be implemented in any kind of network where it is possible to programmatically change the tier of service to a location; e.g., FTTH, DSL, FTTP, or the like. Appropriate hardware and/or software can be located at a point in the network where the service will be comparable to that experienced by the end user.

The configuration shown in FIG. 2 is by way of one non-limiting example, and, as will be discussed further below, CMTS 220 is but one non-limiting example of a policy enforcement point (PEP); cable modem 210 is but one non-limiting example of customer premises equipment (CPE), PCMM server 232 is but one non-limiting example of a policy server, and a cable or HFC network is but one non-limiting example of a broadband communications network.

In at least some instances, servers 230-232 can be located in a head end, such as head end 150 described above; for example, on LANs 158 and/or 160. Furthermore, CMTS 220 could be located in a hub; by way of example and not limitation, the hub site of FIG. 1C (in which case CMTS 220 corresponds to CMTS 199). In other instances, CMTS 220 could be in a head end or a network node; in the former case, CMTS 220 corresponds to CMTS 156 of FIG. 1A. In a conventional case (or in a verification case in accordance with some embodiments of the invention), cable modem 210 and test device 236 reside in a customer's facility. However, in accordance with one or more embodiments of the invention, cable modem 210 and test device 236 reside in a facility of the MSO adjacent CMTS 220 (but as just noted these items may also be duplicated in a customer's facility during a verification stage). IP network 225 can be, for example, a wide area network (WAN) such as the HFC network discussed above, or a portion thereof. If CMTS 220 is collocated with servers 230, 232, 234 (e.g., in a head end 150), then network 225 might be a LAN such as LAN 158 or 160. CMTS 220 can be coupled to cable modem 210 through a wide area network (WAN) such as the HFC network discussed above, or a portion thereof (if the cable modem and CMTS are not collocated). Where the CMTS and cable modem are collocated, they can be connected in a variety if fashions, such as, for example, dedicated cabling. The test device can also be connected to the cable modem in a variety if fashions, such as, for example, dedicated cabling. The test server 230 and download server 234 simulate (for test purposes) data that might be received by the MSO from the Internet by an edge server (not shown) coupled to the Internet and the IP network 225 (such an edge server is described in the aforementioned U.S. Pat. No. 7,388,870.

When a cable modem boots, it receives a boot or configuration file that comprises parameters that determine the way in which the cable modem performs on the cable network. Of relevance here is a QoS profile that affects the manner in which packets are sent and received by the cable modem. The QoS profile preferably includes the following information:

Service class IDs
Minimum traffic rate
Maximum allowed traffic rate
Traffic priority
Grant sizes and intervals
Jitter parameters
Burst & Packet Sizes Cable modems also receive upstream classifiers that are used to identify the manner in which packets are transported in the upstream direction.

As seen at 201 in FIG. 2, test server 234 sends a "start test" message to test device 236, indicating the bandwidth tier for the test. As per 202 in FIG. 2, test device 236 requests a file download from download server 230. This request from test device 236 to download server 230 indicates the appropriate bandwidth tier for the test. As per 203 in FIG. 2, download server 230 sends a change bandwidth (i.e. tier) message to PCMM Server 232. In the flow indicated by 204 in FIG. 2, PCMM Server 232 sends a "set gate" message to CMTS 220. Further details re same will provided below. As indicated by 205 in FIG. 2, PCMM server 232 sends a "success" response to download server 230, indicating success of the "set gate" message to CMTS 220. In response to same, as indicated by 206 in FIG. 2, download server 230 starts sending packets to test client (on test device 236), in accordance with the bandwidth tier just set.

A variety of different messaging techniques can be employed to send and receive the different messages just described. In a preferred but non-limiting approach, DOCSIS and PCMM messaging techniques are employed. As will be appreciated by the skilled artisan, a PacketCable Multimedia Gate is a logical representation of a policy decision that has been installed on the CMTS 220. A Gate is used to control access by a single IP flow to enhanced QoS Services provided by a DOCSIS cable network. In version I05 of the PCMM specification, released Oct. 29, 2009, gates are unidirectional; a single Gate controls access to a flow in either the upstream or the downstream direction, but not both. For a bi-directional IP session, two Gates are required, one for upstream and one for downstream, each identified by a unique GateID. Note that in PacketCable 1.x, a single GateID may reference both an upstream and a downstream Gate. Embodiments of the invention can employ a variety of approaches using different versions of the PCMM specification or different specifications altogether.

In PacketCable Multimedia, each Gate has a separate GateID. The Gate defines the authorization, reservation and committed envelopes to be used by the CMTS 220 to perform authorization, reservation and commit operations. Gates can be further qualified as either unicast or multicast; these are essentially as described above, albeit with a significant differentiator between them—the destination IP address indicated in the classifier object. In a Unicast Gate the destination IP address (v4 or v6) contained in the classifier identifies a unicast IP address (or a range of unicast IP addresses). A Multicast Gate contains a destination IP address (v4 or v6) in the classifier identifying a multicast IP address. For IPv6 unicast and multicast IP address definitions, see IETF RFC 4291, IP Version 6 Addressing Architecture, February 2006, incorporated herein by reference in its entirety for all purposes. For IPv4 multicast address assignments, see IETF RFC 3171, IANA Guidelines for IPv4 Multicast Address Assignment, August 2001, incorporated herein by reference in its entirety for all purposes.

Thus, having received the "set gate" message from PCMM server 232 in the flow indicated by 204 in FIG. 2, CMTS will handle packets intended for the IP address of cable modem 210 in accordance with the selected bandwidth tier for the test. Test device 236 then measures the downstream speed. If desired, the process can be repeated for every tier of service offered by the MSO. The table of FIG. 7 presents a non-limiting example of tiers of service offered by a major MSO.

It should be noted that upstream speeds can be tested in an analogous manner to downstream speeds; instead of downloading a file from the download server, upload a file to this server and dynamically change the tier of upstream service. Thus, server 230 can be viewed as a download-upload server and is labeled as such in the examples in the figures. It should be understood that some instances may include a server that carries out only a download function; some instances may include a server that carries out only an upload function; and some instances may include a server or servers that carry out both download and upload functions. As used herein, including the claims, a "test material server" comprises a server that can carry out downloading and/or uploading as specified in a particular claim and may or may not carry out additional functions. If no function is specified in a particular claim, a test material server encompasses a server that carries out only a download function, a server that carries out only an upload function, or one or more servers that carry out both download and upload functions. For example, if a claim recites a "test material server" and specifies that such server carries out a download function, such server may or may not also carry out an upload function.

Figure 3:
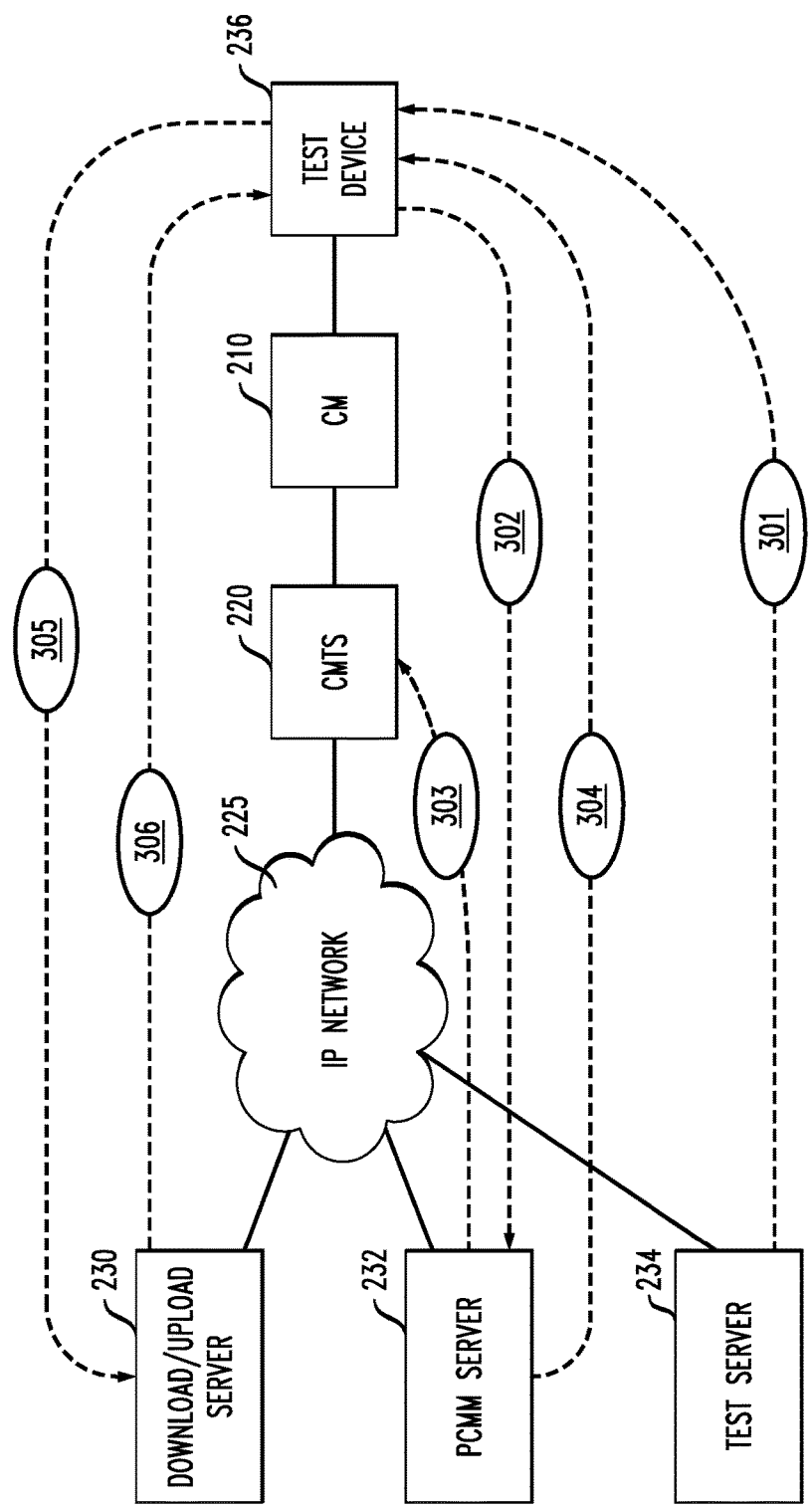
FIG. 3 is a functional block diagram, with command and data flows, depicting a test client-initiated technique for dynamically changing tier of service on a test device, in accordance with one embodiment of the invention.

FIG. 3 is a functional block diagram, with command and data flows, depicting a test client-initiated technique for dynamically changing tier of service on a test device, in accordance with one embodiment of the invention. As depicted at 301 in FIG. 3, test server 234 sends a "start test" message to test device 236 indicating the desired bandwidth tier for the test. As per 302 in FIG. 3, test device 236 sends a change bandwidth request to PCMM server 232, indicating the desired bandwidth tier for the test. In the flow indicated by 303 in FIG. 3, PCMM server 232 sends a set gate message to CMTS 220. As indicated by 304 in FIG. 3, PCMM server 232 sends a "success" response to test client (on test device 236), indicating success of the "set gate" message to CMTS 220. In response to same, as indicated by 305 in FIG. 3, test device 236 requests file download from download server 230; as indicated at the flow corresponding to 306 in FIG. 3, download server 230 starts sending packets to test client (on test device 236), in accordance with the bandwidth tier just set. Test device 236 then measures the downstream speed. Again, if desired, the process can be repeated for every tier of service offered by the MSO.

Figure 4:
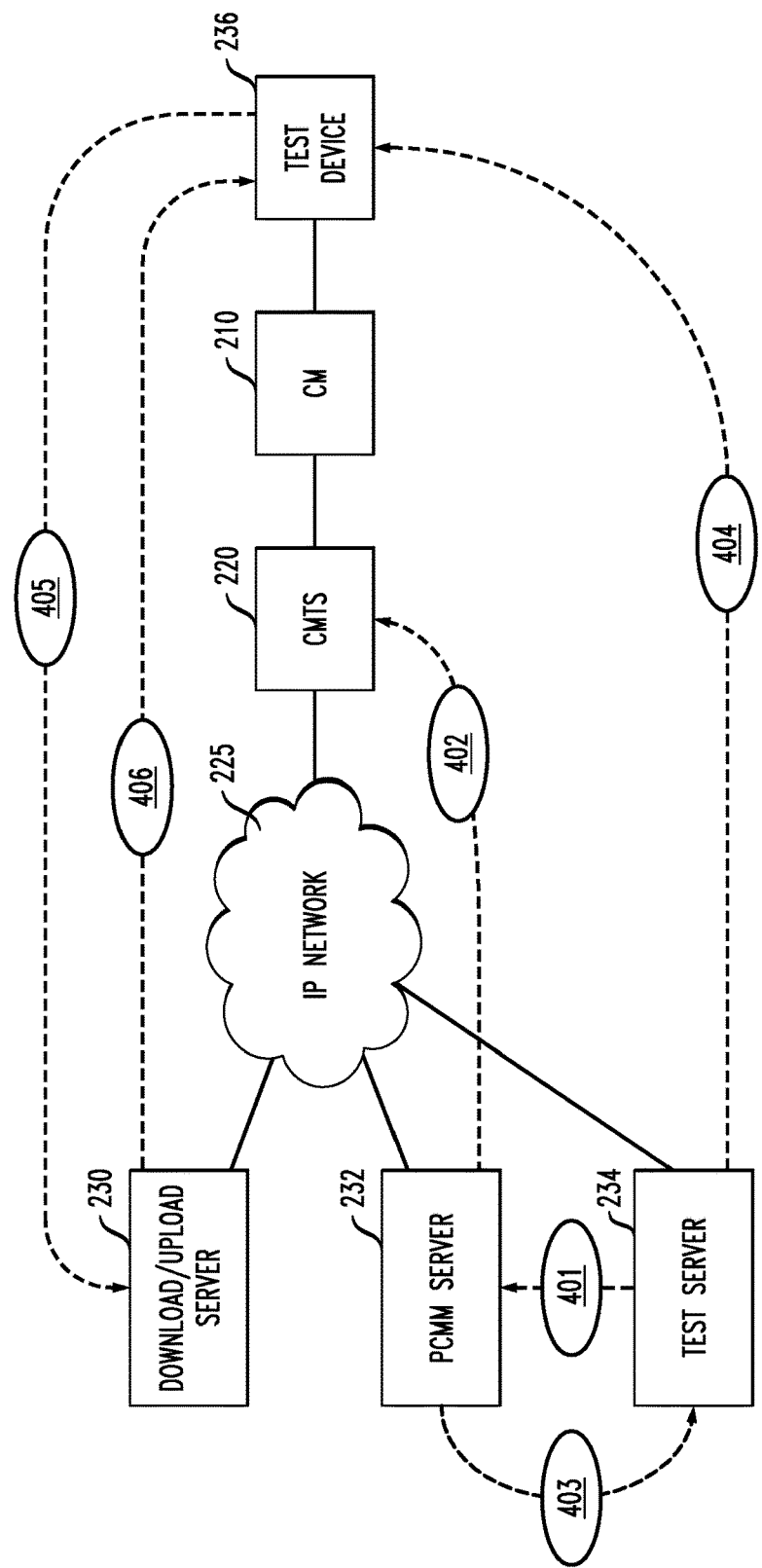
FIG. 4 is a functional block diagram, with command and data flows, depicting a test server-initiated technique for dynamically changing tier of service on a test device, in accordance with one embodiment of the invention.

FIG. 4 is a functional block diagram, with command and data flows, depicting a test server-initiated technique for dynamically changing tier of service on a test device, in accordance with one embodiment of the invention. As shown at the flow indicated by 401 in FIG. 4, test server 234 sends a change bandwidth (i.e. tier) message to PCMM server 232; then, as per 402 in FIG. 4, PCMM server 232 sends a set gate message to CMTS 220. As indicated by 403 in FIG. 4, PCMM server 232 sends a "success" response to test server 234, indicating success of the "set gate" message to CMTS 220. As per 404 in FIG. 4, test server 234 sends a start test message to test device 236; as per 405 in FIG. 4, test device 236 requests file download from download server 230. In response, as per 406 in FIG. 4, download server 230 starts sending packets to test client (on test device 236). Test device 236 then measures the downstream speed. Once again, if desired, the process can be repeated for every tier of service offered by the MSO.

Again, it is to be emphasized that the system depicted in FIGS. 2-4, and the three exemplary data flows depicted therein (download server initiated, test client initiated, and test server initiated), are exemplary and non-limiting in nature. CMTS 220 is but one non-limiting example of a Policy Enforcement Point (PEP); cable modem 210 is but one non-limiting example of Customer Premises Equipment (CPE); PCMM server 232 is but one non-limiting example of a Policy Server, and a cable or HFC network is but one non-limiting example of a broadband communications network. It should be noted that any of the servers 230, 232, 234 could, in some cases, be different server programs on the same physical machine.

It should also be noted that test server 234 may initiate test requests on-demand from the system (e.g., MSO) operator or via a predetermined schedule.

Thus, by way of review, heretofore, a panel of users has been acquired such that the panel statistically represents all the different broadband tiers offered by the Internet Service provider (ISP). Since there is not a uniform distribution of users across tiers, it is difficult to get a representative number of users in each tier. When recruiting a tier, a large number of users must be attracted and maintained in order to get a statistically significant sample across every tier—in short, a large number of people are needed. Furthermore, some tiers may be lightly populated.

There is typically some variation by market. In the non-limiting example of FIG. 7, there are six tiers and eleven total ranges. To assemble a suitably wide panel would entail logistical difficulties, including many test devices to install in homes; many users to manage and contact, and infrastructure to maintain. Possibly, ten or twenty thousand users might be involved.

Still by way of review, in a preferred but non-limiting embodiment, in DOCSIS, through use of PacketCable™ Multimedia (mark of Cable Television Laboratories, Inc., Louisville, Colo., USA) it is possible to dynamically signal from an application to a policy server which signals the CMTS to dynamically change the tier of service signaled by an application. For example, it is possible to have the speed test download server signal the CMTS or policy server and say "set this user as a 'light' user for the duration of this test." When the test is over, signal again and restore the user to the nominal tier (whatever tier the user is provisioned at; e.g., "turbo" rather than "light"). Thus, one can install a smaller number of testers based on network topology (to make sure, e.g., that the test is "hitting" every hub or some statistical sample of hubs, zip codes, or the like). The users undergoing test can, in some instances, be cycled through the different tiers on a periodic basis, just for the test. Therefore, one or more embodiments reduce or eliminate the need for such a large panel (as required in current techniques) as testing can be based on enough statistically valid measurements per given region or given network topology and each test device can be cycled through the different tiers.

In one or more instances, initial data rates are set through provisioning, but PCMM allows signaling the CMTS to change the provisioned rate by setting what is known as a gate, as discussed above. Embodiments of the invention link the test application to the infrastructure for the purpose of reducing the panel size.

As noted, cable and/or HFC networks are but one non-limiting example of broadband communications networks within which one or more techniques of the invention can be implemented. Other non-limiting examples are Asymmetric Digital Subscriber Line (ADSL), DSL, FTTP, FTTH, and the like. It should be noted that in some instances, such as DSL, the bandwidth tier attained by the user is influenced by distance from the DSLAM (Digital Subscriber Line Access Multiplexer (DSLAM)) and this effect should be considered when conducting tests by dynamically changing a subscriber's tier in such instances, in accordance with one or more embodiments of the invention. Similar issues may arise with ADSL, for example. In one or more embodiments using an HFC network (active network), the constraint is not distance but capacity and the MSO has control over same.

Figure 6:
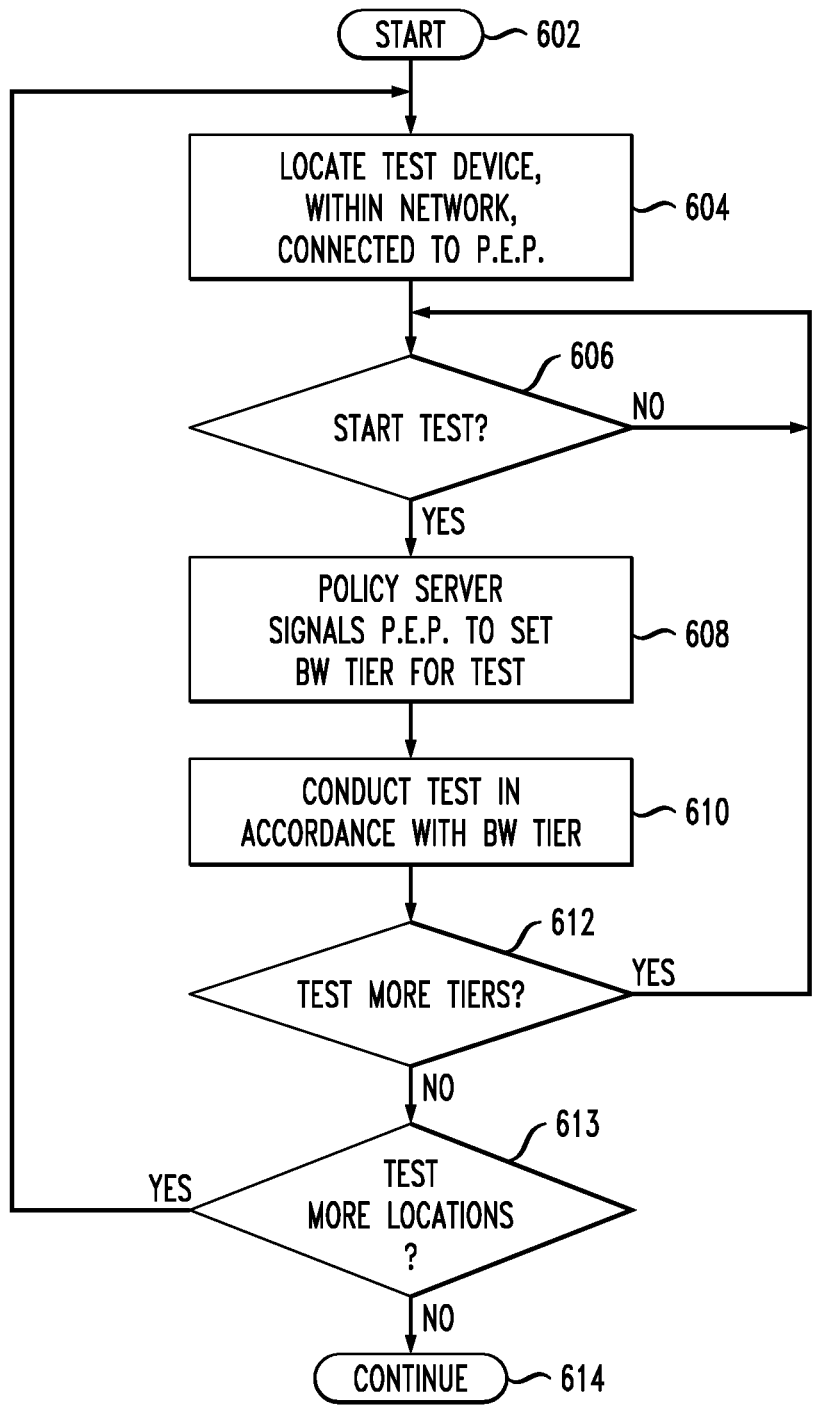
FIG. 6 is a flow chart of an exemplary method, in accordance with one embodiment of the invention.

Attention should now be had to the flow chart of FIG. 6, which begins in step 602. Given the discussion thus far, it will be appreciated that, in general terms, an exemplary method, according to an aspect of the invention, includes the step 604 of locating a test device 236 within a broadband communications network (e.g., cable, HFC, DSL, FTTH, FTTP, FTTC, ADSL, fixed wireless, mobile wireless, or the like; indeed, any network where it is possible to provision different tiers of service to a device). The test device is interconnected with a policy enforcement point (e.g., CMTS 220) of the broadband communications network. As shown at "YES" branch decision block 606 and step 608, responsive to commencement of a test to be conducted with the test device, another step includes signaling the policy enforcement point, from a policy server (e.g., 232) of the broadband communications network, to set a bandwidth tier for the test to be conducted with the test device. A further step 610 includes conducting the test with the test device in accordance with the bandwidth tier. Note that the "NO" branch of block 606 merely indicates waiting for a test to start. Note also that testing can, in general, include, for example, downloading and/or uploading.

As indicated at decision block 612 ("YES" branch), optionally, as many tiers as desired can be tested, with the same test device, using the dynamic signaling techniques in accordance with one or more embodiments of the invention. Thus, in some instances, the test described in the preceding paragraph is a first test and the bandwidth tier is a first bandwidth tier, and an additional step includes, responsive to commencement of a second test to be conducted with the test device, signaling the policy enforcement point, from the policy server of the broadband communications network, to set a second bandwidth tier for the second test to be conducted with the test device (repetition of steps 606 and 608). The first and second bandwidth tiers are different. Another additional step includes conducting the second test with the test device in accordance with the second bandwidth tier (repetition of step 610).

In a preferred but non-limiting approach, the signaling and conducting steps are repeated until all bandwidth tiers offered by an operator of the broadband communications network have been tested on the test device.

In one or more instances, step 604 includes collocating the test device with the policy enforcement point in an edge node (by way of example and not limitation, a hub) of the broadband communications network.

In some instances (for example, if no more tiers are to be tested ("NO" branch of block 612)), additional steps could include (e.g., if more locations are to be tested as per the "YES" branch of block 612) repeating one, some, or all of steps 604-612.

For example, in some instances, an additional step includes locating another test device within a premises connected to the broadband communications network. This test device is also interconnected with the aforementioned policy enforcement point of the broadband communications network. At least one additional test is conducted with this test device to verify accuracy of the test device in the edge node.

Also by way of example, one, some, or all of steps 604-612 can be repeated at a plurality of different locations within the broadband communications network to obtain a statistically valid indication of performance thereof.

As noted, tests can be commenced on demand and/or in accordance with a predetermined schedule.

If no more tiers or locations are to be tested, as per the "NO" branch of block 612, flow can continue to block 614, where processing can cease or new commands can be awaited.

In some instances (e.g., as described above in connection with FIG. 2), the broadband communications network is a hybrid fiber cable network, the signaling of the policy enforcement point is a set gate message, the policy enforcement point is a cable modem termination system 220, and the policy server is a packet cable multimedia server 232. An additional step in such instances includes, as shown at 201, sending, from a test server 234 of the broadband communications network, to the test device 236, a start test message. The start test message indicates the bandwidth tier for the test to be conducted with the test device. Another additional step in such instances includes, as shown at 202, responsive to the test device receiving the start test message, requesting, from a test material server 230 of the broadband communications network, by the test device, a file download. The request indicates the bandwidth tier for the test to be conducted with the test device. A further additional step in such cases includes, as shown at 203, sending, from the test material server to the packet cable multimedia server, a change bandwidth message. The packet cable multimedia server sends the set gate message in response thereto, as at 204 (non-limiting specific example of step 608). A still further additional step in such cases, as shown at 205, includes sending, from the packet cable multimedia server to the test material server, an indication of success of the set gate message. As shown at 206, in such instances, the conducting of the test (step 610) includes the test material server sending packets to the test device in response to the indication of success of the set gate message.

In another aspect (e.g., as described above in connection with FIG. 3), the broadband communications network is a hybrid fiber cable network, the signaling of the policy enforcement point includes a set gate message, the policy enforcement point comprises a cable modem termination system 220, and the policy server comprises a packet cable multimedia server 232. An additional step in such instances includes, as shown at 301, sending, from a test server 234 of the broadband communications network, to the test device 236, a start test message. The start test message indicates the bandwidth tier for the test to be conducted with the test device. Another additional step in such instances includes, as shown at 302, responsive to the test device receiving the start test message, sending, from the test device, to the packet cable multimedia server, a change bandwidth message. The change bandwidth message indicates the bandwidth tier for the test to be conducted with the test device. As seen at 303, the packet cable multimedia server sends the set gate message in response thereto (non-limiting specific example of step 608). A still further additional step in such cases, as shown at 304, includes sending, from the packet cable multimedia server to the test device, an indication of success of the set gate message. An even further additional step in such cases, as shown at 305, includes, responsive to the test device receiving the indication of success of the set gate message, requesting, from a test material server 230 of the broadband communications network, by the test device 236, a file download. In this instance, as shown at 306, the conducting of the test (step 610) includes the test material server sending packets to the test device in response to the request for the file download.

In still another aspect (e.g., as described above in connection with FIG. 4), the broadband communications network is a hybrid fiber cable network, the signaling of the policy enforcement point comprises a set gate message, the policy enforcement point comprises a cable modem termination system 220; and the policy server comprises a packet cable multimedia server 232. An additional step in such instances includes, as shown at 401, sending, from a test server 234 of the broadband communications network, to the packet cable multimedia server 232, a change bandwidth message. The change bandwidth message indicates the bandwidth tier for the test to be conducted with the test device 236. The packet cable multimedia server 232 sends the set gate message to the cable modem termination system in response thereto, as shown at 402. Other additional steps in such instances include, as shown at 403, sending, from the packet cable multimedia server to the test server 234, an indication of success of the set gate message; and, as shown at 404, sending, from the test server of the broadband communications network, to the test device, a start test message. An even further additional step in such instances includes, as at 405, responsive to the test device receiving the start test message, requesting, from a test material server 230 of the broadband communications network, by the test device, a file download. Step 610 in this instance includes the test material server sending packets to the test device in response to the request for the file download.

Note that "test client" and "test device" are used somewhat interchangeably herein; the skilled artisan will appreciate that in one or more embodiments, the test client is a piece of software running on the test device.

Furthermore, given the discussion thus far, it will be appreciated that, in general terms, an exemplary system, according to an aspect of the invention, includes a broadband communications network (e.g., cable, HFC 101, DSL, FTTH, FTTP, ADSL, or the like), a policy enforcement point (e.g., CMTS 220 or the like) of the broadband communications network, a policy server (e.g., PCMM server 232 or the like) of the broadband communications network, and a test device 236 located within the broadband communications network. The test device is interconnected with the policy enforcement point of the broadband communications network. The policy server is configured to, responsive to commencement of a test to be conducted with the test device, signal the policy enforcement point to set a bandwidth tier for the test to be conducted with the test device. The policy enforcement point and the test device are cooperatively configured to conduct the test in accordance with the bandwidth tier. Note also that testing can, in general, include, for example, downloading and/or uploading.

As described with respect to FIG. 6, in at least some instances, the test is a first test and the bandwidth tier is a first bandwidth tier. In such instances, in some embodiments, the policy server is further configured to, responsive to commencement of a second test to be conducted with the test device, signal the policy enforcement point to set a second bandwidth tier for the second test to be conducted with the test device. The first and second bandwidth tiers are different. Furthermore, in such instances, in some embodiments, the policy enforcement point and the test device are further cooperatively configured to conduct the second test in accordance with the second bandwidth tier.

As also described with respect to FIG. 6, in at least some instances, the policy server, the policy enforcement point, and the test device are further cooperatively configured to repeat the signaling and conducting until all bandwidth tiers offered by an operator of the broadband communications network have been tested on the test device.

In some cases, the broadband communications network includes an edge node, and the test device and the policy enforcement point are collocated in the edge node of the broadband communications network. In some cases, the edge node is a hub, a non-limiting example of which is shown in FIG. 1C.

Once more, as described with respect to FIG. 6, in some cases, another test device is located within a premises connected to the broadband communications network; such test device is interconnected with the policy enforcement point of the broadband communications network. The policy server, the policy enforcement point, and the other test device are cooperatively configured to conduct at least one additional test to verify accuracy of the test device in the edge node.

Yet again, as described with respect to FIG. 6, in some instances, the system includes a plurality of additional policy enforcement points and a plurality of additional test devices, and the policy server, the plurality of additional policy enforcement points, and the plurality of additional test devices are cooperatively configured to repeat the locating, signaling and conducting at a plurality of different locations within the broadband communications network to obtain a statistically valid indication of performance thereof.

In some cases, the system further includes a test server 234; such test server can be configured to initiate the tests on demand and/or in accordance with a predetermined schedule.

In some cases, such as discussed with respect to FIGS. 2-4, the system further includes a test server 234 of the broadband communications network and a test material server 230 of the broadband communications network; the broadband communications network is a hybrid fiber cable network, the signaling of the policy enforcement point is a set gate message, the policy enforcement point is a cable modem termination system 220; and the policy server is a packet cable multimedia server 232. Such a system can be cooperatively configured, for example, to carry out any or all of the techniques as described with respect to FIGS. 2-4.

For example, as described with respect to FIG. 2, in some instances, the test server 234 is configured to send, to the test device, a start test message. The start test message indicates the bandwidth tier for the test to be conducted with the test device. The test device is configured to, responsive to the test device receiving the start test message, request, from the test material server, a file download. The request indicates the bandwidth tier for the test to be conducted with the test device. The test material server is configured to send, to the packet cable multimedia server, a change bandwidth message. The packet cable multimedia server sends the set gate message in response thereto. The packet cable multimedia server is configured to send, to the test material server, an indication of success of the set gate message. The test is conducted via the test material server sending packets to the test device in response to the indication of success of the set gate message.

In another example, as described with respect to FIG. 3, in some instances, the test server is configured to send, to the test device, a start test message. The start test message indicates the bandwidth tier for the test to be conducted with the test device. The test device is configured to, responsive to receiving the start test message, send to the packet cable multimedia server a change bandwidth message. The change bandwidth message indicates the bandwidth tier for the test to be conducted with the test device. The packet cable multimedia server sends the set gate message in response thereto. The packet cable multimedia server is configured to send, to the test device, an indication of success of the set gate message. The test device is configured to, responsive to receiving the indication of success of the set gate message, request, from the test material server of the broadband communications network, a file download. The test is conducted via the test material server sending packets to the test device in response to the request for the file download.

In still another example, as described with respect to FIG. 4, in some instances, the test server is configured to send, to the packet cable multimedia server, a change bandwidth message. The change bandwidth message indicates the bandwidth tier for the test to be conducted with the test device. The packet cable multimedia server sends the set gate message to the cable modem termination system in response thereto. The packet cable multimedia server is configured to send, to the test server, an indication of success of the set gate message. The test server is configured to send, to the test device, a start test message. The test device is configured to, responsive to receiving the start test message, request, from the test material server, a file download. The test is conducted via the test material server sending packets to the test device in response to the request for the file download.

In another aspect, an exemplary method includes the step 608 of, responsive to an indication of commencement of a first test to be conducted with a test device 236 located within a broadband communications network (e.g., cable, HFC 101, DSL, FTTH, FTTP, ADSL, or the like), signaling a policy enforcement point (e.g., CMTS 220 or the like), from a policy server (e.g., PCMM server 232 or the like) of said broadband communications network, to set a first bandwidth tier for said first test to be conducted with said test device. Said test device is interconnected with said policy enforcement point of said broadband communications network. An additional step includes, responsive to an indication of commencement of a second test to be conducted with said test device, signaling said policy enforcement point, from said policy server of said broadband communications network, to set a second bandwidth tier for said second test to be conducted with said test device. An example of such a step is repeating step 608. The first and second bandwidth tiers are different.

In still another aspect, an exemplary method includes the step of facilitating location of a test device within a broadband communications network (e.g., carrying out step 604 or supplying a test module to the operator of the network so that the operator can carry out step 604). Said test device is interconnected with a policy enforcement point (e.g., CMTS 220 or the like) of said broadband communications network (e.g., cable, HFC 101, DSL, FTTH, FTTP, ADSL, or the like). Additional steps include conducting a first test with said test device in accordance with a first bandwidth tier dynamically set by an operator of said broadband communications network; and conducting a second test with said test device in accordance with a second bandwidth tier set by said operator of said broadband communications network (e.g., repeating step 610). Said first and second bandwidth tiers are different.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 5:
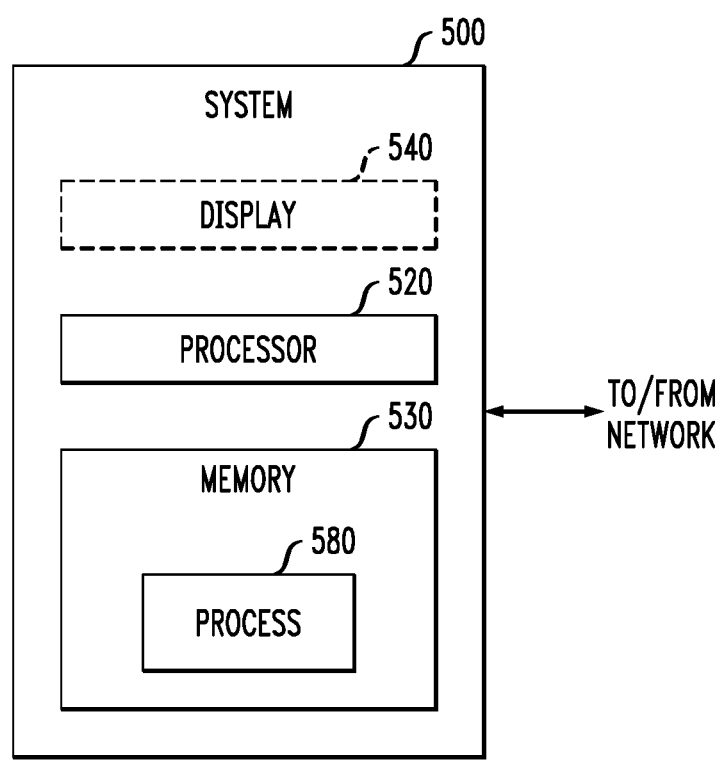
FIG. 5 is a block diagram of a computer system useful in connection with one or more aspects of the invention.

FIG. 5 is a block diagram of a system 500 that can implement part or all of one or more aspects or processes of the present invention, processor 520 of which is representative of processors associated with servers, clients, set top terminals, controllers, and such other elements with processing capability depicted in the other figures as would be apparent to the skilled artisan from the teachings herein. In one or more embodiments, inventive steps are carried out by one or more of the processors in conjunction with one or more interconnecting network(s).

As shown in FIG. 5, memory 530 configures the processor 520 to implement one or more methods, steps, and functions (collectively, shown as process 580 in FIG. 5). The memory 530 could be distributed or local and the processor 520 could be distributed or singular. Different steps could be carried out by different processors. In one or more embodiments, in addition to one or more servers or other general purpose computers, some steps are carried out by a processor or processors of a cable modem termination system and/or a test device.

The memory 530 could be implemented as an electrical, magnetic or optical memory, or any combination of these or other types of storage devices. It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal. Such a recordable medium stores data and/or instructions in a non-transitory manner.

At least some of the elements described herein each typically contain a memory that will configure associated processors to implement the methods, steps, and functions disclosed herein. Such methods, steps, and functions can be carried out, e.g., by processing capability on individual elements in the figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a server or servers 230, 232, and/or 234; CMTS 220, and/or test device 236, and that such program may be embodied on a tangible computer readable recordable storage medium.

As used herein, including the claims, a "server" includes a physical data processing system (for example, system 500 as shown in FIG. 5) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. test material server module, PCMM or other policy server module, test server module, CMTS or other policy enforcement point module, test device module, and so on). The method steps can then be carried out using the distinct software modules of the system, as described above, executing on the one or more hardware processors (e.g., a processor or processors in the servers 230, 232, and/or 234; in the CMTS 220, and/or in the test device 236, and so on). Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, UNIX shell scripts (for example, to generate information to supply to a controller), and the like. RPC can be employed for interface protocols, for example. Furthermore, non-limiting examples of useful database software include Oracle software (registered mark of Oracle International Corporation, 500 Oracle Parkway, Redwood City, Calif. 94065, USA); Informix software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Aspects of one or more blocks, components, sub-blocks, sub-components, modules and/or sub-modules may be realized by one or more DSPs. A DSP typically comprises a combination of digital logic devices and other components, which may be a state machine or implemented with a dedicated microprocessor or microcontroller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    locating a test device within a broadband communications network, said test device being interconnected with a policy enforcement point of said broadband communications network via a customer premises equipment (CPE) device;
    responsive to commencement of a test to be conducted with said test device, signaling said policy enforcement point, from a policy server of said broadband communications network, to set a bandwidth tier for said test to be conducted with said test device, wherein said setting of said bandwidth tier changes an initially provisioned bandwidth tier set at said policy enforcement point for communications with said CPE device; and
    conducting said test with said test device in accordance with said bandwidth tier, wherein said test determines a speed of said broadband communication network at said test device in said bandwidth tier.

2. The method of claim 1, further comprising restoring said initially provisioned bandwidth tier set at said policy enforcement point.

3. The method of claim 1, further comprising repeating said signaling and conducting steps until all bandwidth tiers offered by an operator of said broadband communications network have been tested using said test device.

4. The method of claim 1, wherein:
    said broadband communications network comprises a hybrid fiber cable network;
    said signaling of said policy enforcement point comprises a set gate message;
    said policy enforcement point comprises a cable modem termination system; and
    said policy server comprises a packet cable multimedia server;
    further comprising the additional steps of:
        sending, from a test server of said broadband communications network, to said test device, a start test message, said start test message indicating said bandwidth tier for said test to be conducted with said test device;
        responsive to said test device receiving said start test message, requesting, from a test material server of said broadband communications network, by said test device, a file download, said requesting indicating said bandwidth tier for said test to be conducted with said test device;
        sending, from said test material server to said packet cable multimedia server, a change bandwidth message, said packet cable multimedia server sending said set gate message in response thereto; and
        sending, from said packet cable multimedia server to said test material server, an indication of success of said set gate message;
    wherein said conducting of said test comprises said test material server sending packets to said test device in response to said indication of success of said set gate message.

5. The method of claim 1, wherein:
    said broadband communications network comprises a hybrid fiber cable network;
    said signaling of said policy enforcement point comprises a set gate message;
    said policy enforcement point comprises a cable modem termination system; and
    said policy server comprises a packet cable multimedia server;
    further comprising the additional steps of:
        sending, from a test server of said broadband communications network, to said test device, a start test message, said start test message indicating said bandwidth tier for said test to be conducted with said test device;
        responsive to said test device receiving said start test message, sending, from said test device, to said packet cable multimedia server, a change bandwidth message, said change bandwidth message indicating said bandwidth tier for said test to be conducted with said test device, said packet cable multimedia server sending said set gate message in response thereto;
        sending, from said packet cable multimedia server to said test device, an indication of success of said set gate message;
        responsive to said test device receiving said indication of success of said set gate message, requesting, from a test material server of said broadband communications network, by said test device, a file download;
    wherein said conducting of said test comprises said test material server sending packets to said test device in response to said request for said file download.

6. The method of claim 1, wherein:
    said broadband communications network comprises a hybrid fiber cable network;
    said signaling of said policy enforcement point comprises a set gate message;
    said policy enforcement point comprises a cable modem termination system; and said policy server comprises a packet cable multimedia server;
further comprising the additional steps of:
sending, from a test server of said broadband communications network, to said packet cable multimedia server, a change bandwidth message, said change bandwidth message indicating said bandwidth tier for said test to be conducted with said test device, said packet cable multimedia server sending said set gate message to said cable modem termination system in response thereto;
sending, from said packet cable multimedia server to said test server, an indication of success of said set gate message;
sending, from said test server of said broadband communications network, to said test device, a start test message; and
responsive to said test device receiving said start test message, requesting, from a test material server of said broadband communications network, by said test device, a file download;
wherein said conducting of said test comprises said test material server sending packets to said test device in response to said request for said file download.

7. A system comprising:
a broadband communications network;
a policy enforcement point of said broadband communications network;
a policy server of said broadband communications network; and
a test device located within said broadband communications network, said test device being interconnected with said policy enforcement point of said broadband communications network via a customer premises equipment (CPE) device;
wherein:
said policy server is configured to, responsive to commencement of a test to be conducted with said test device, signal said policy enforcement point to set a bandwidth tier for said test to be conducted with said test device, wherein said setting of said bandwidth tier changes an initially provisioned bandwidth tier set at said policy enforcement point for communications with said CPE device; and
said policy enforcement point and said test device are cooperatively configured to conduct said test in accordance with said bandwidth tier, wherein said test determines a speed of said broadband communication network at said test device in said bandwidth tier.

8. The system of claim 7, wherein said policy enforcement point is configured to restore, after said test, said initially provisioned bandwidth tier set at said policy enforcement point.

9. The system of claim 7, wherein said policy server, said policy enforcement point, and said test device are further cooperatively configured to repeat said signaling and conducting until all bandwidth tiers offered by an operator of said broadband communications network have been tested using said test device.

10. The system of claim 7, further comprising:
a plurality of additional policy enforcement points; and
a plurality of additional test devices;
wherein said policy server, said plurality of additional policy enforcement points, and said plurality of additional test devices are cooperatively configured to repeat said locating, signaling and conducting at a plurality of different locations within said broadband communications network to obtain a statistically valid indication of said speed thereof.

11. The system of claim 7, further comprising a test server of said broadband communications network and a test material server of said broadband communications network, wherein:
said broadband communications network comprises a hybrid fiber cable network;
said signaling of said policy enforcement point comprises a set gate message;
said policy enforcement point comprises a cable modem termination system;
said policy server comprises a packet cable multimedia server;
said test server is configured to send, to said test device, a start test message, said start test message indicating said bandwidth tier for said test to be conducted with said test device;
said test device is configured to, responsive to said test device receiving said start test message, request, from said test material server, a file download, said requesting indicating said bandwidth tier for said test to be conducted with said test device;
said test material server is configured to send, to said packet cable multimedia server, a change bandwidth message, said packet cable multimedia server sending said set gate message in response thereto;
said packet cable multimedia server is configured to send, to said test material server, an indication of success of said set gate message; and
said conducting of said test comprises said test material server sending packets to said test device in response to said indication of success of said set gate message.

12. The system of claim 7, further comprising a test server of said broadband communications network and a test material server of said broadband communications network, wherein:
said broadband communications network comprises a hybrid fiber cable network;
said signaling of said policy enforcement point comprises a set gate message;
said policy enforcement point comprises a cable modem termination system;
said policy server comprises a packet cable multimedia server;
said test server is configured to send, to said test device, a start test message, said start test message indicating said bandwidth tier for said test to be conducted with said test device;
said test device is configured to, responsive to receiving said start test message, send to said packet cable multimedia server a change bandwidth message, said change bandwidth message indicating said bandwidth tier for said test to be conducted with said test device, said packet cable multimedia server sending said set gate message in response thereto;
said packet cable multimedia server is configured to send, to said test device, an indication of success of said set gate message;
said test device is configured to, responsive to receiving said indication of success of said set gate message, request, from said test material server of said broadband communications network, a file download; and
said conducting of said test comprises said test material server sending packets to said test device in response to said request for said file download.

13. The system of claim 7, further comprising a test server of said broadband communications network and a test material server of said broadband communications network, wherein:
- said broadband communications network comprises a hybrid fiber cable network;
- said signaling of said policy enforcement point comprises a set gate message;
- said policy enforcement point comprises a cable modem termination system; and
- said policy server comprises a packet cable multimedia server;
- wherein said test server is configured to send, to said packet cable multimedia server, a change bandwidth message, said change bandwidth message indicating said bandwidth tier for said test to be conducted with said test device, said packet cable multimedia server sending said set gate message to said cable modem termination system in response thereto;
- said packet cable multimedia server is configured to send, to said test server, an indication of success of said set gate message;
- said test server is configured to send, to said test device, a start test message;
- said test device is configured to, responsive to receiving said start test message, request, from said test material server, a file download; and
- said conducting of said test comprises said test material server sending packets to said test device in response to said request for said file download.

* * * * *